Jan. 19, 1954  E. H. LINDEMAN  2,666,637
LEAF SPRING STRUCTURE
Filed June 11, 1949
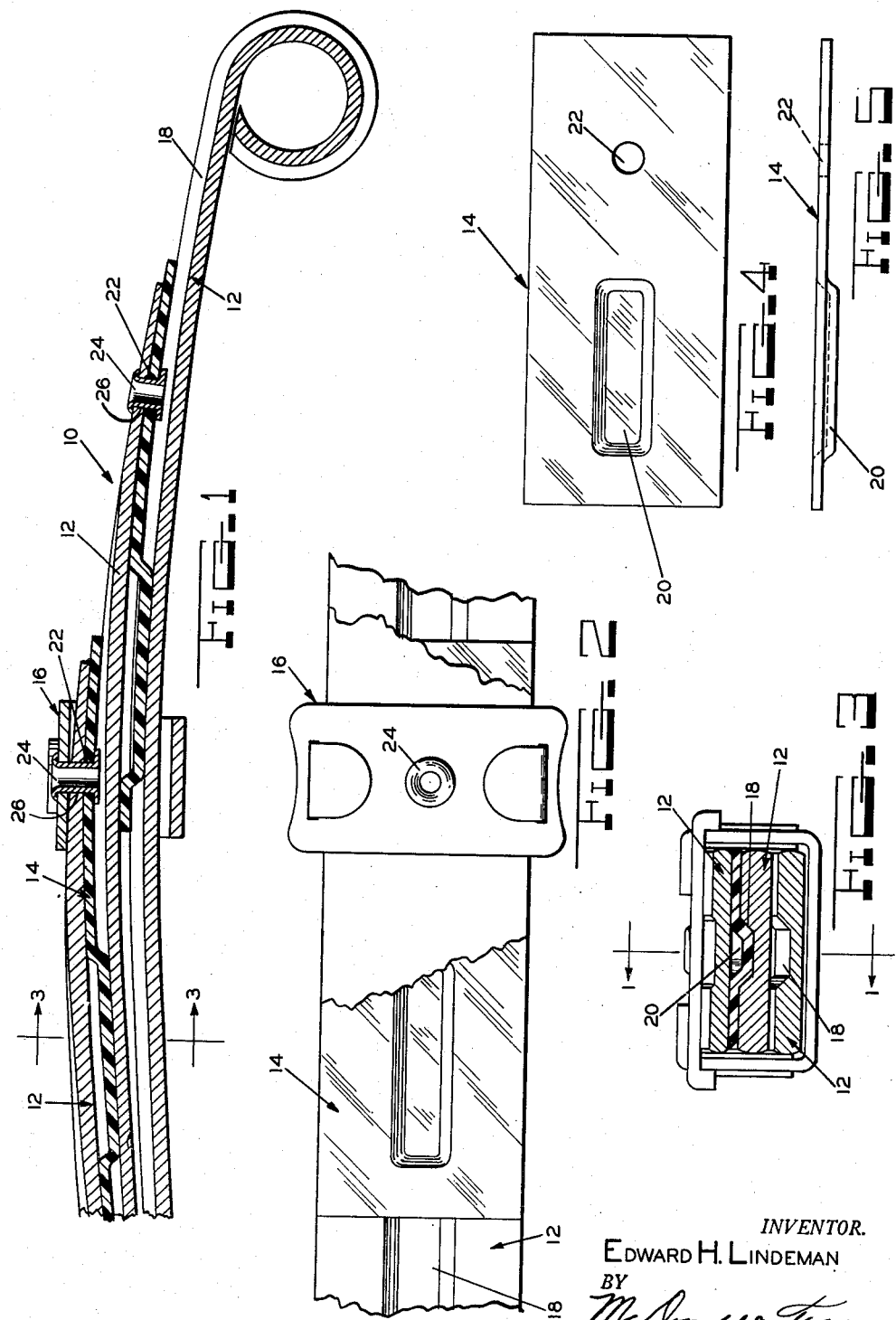
INVENTOR.
EDWARD H. LINDEMAN
BY
McDonald & Fragno
ATTORNEYS Patented Jan. 19, 1954

2,666,637

UNITED STATES PATENT OFFICE 2,666,637

LEAF SPRING STRUCTURE

Edward H. Lindeman, Detroit, Mich., assignor to Eaton Manufacturing Company, Cleveland, Ohio, a corporation of Ohio Application June 11, 1949, Serial No. 98,510

2 Claims. (Cl. 267—49)

This invention relates to leaf springs and more particularly to tip liners or spacers therefor.

Broadly, the invention comprehends the provision of leaf spring tip liners, primarily for use with grooved leaf springs, having a rib near one end adapted to be received in the grooved portion of one spring leaf and its other end adapted to be rigidly secured to the adjacent spaced leaf spring.

An object of the invention is the provision of a simple and economically produced leaf spring tip spacer that is effective in use.

Another object of the invention is the provision of a leaf spring spacer stamped, molded or the like from plastic or like material having a generally flat rectangular shape with a rib extending from one of its flat faces near one end and having an opening through the face disposed from the rib nearer its other end.

A further object of the invention is the provision of a leaf spring tip spacer for use with grooved type spring leaves adapted to prevent squeaks and maintain uniform friction therebetween under all weather conditions, said spacers incorporating structure operable jointly with the spring leaves to prevent either the longitudinal or sideways motion thereof while at the same time permitting of the longitudinal relative motion between adjacent spring leaves when they are flexed.

A further object of the invention is the provision of a leaf spring tip liner or spacer made from a material of low coefficient of friction having good abrasion or wear resisting properties and of a structure permitting of ease of installation and removal from assembly between the tips of adjacent spring leaves without necessity of removing the spring assembly from its associated vehicle.

Other and further important objects and advantages of this invention will be apparent from the following description taken in connection with the drawings forming a part of the specification and in which;

Fig. 1 is a fragmentary cross-sectional view taken substantially along lines 1—1 of Fig. 3 of a grooved leaf spring assembly having leaf spring tip spacers forming the basis of the invention incorporated therein; and Fig. 2 is a fragmentary partially cut away view of the top plan view of Fig. 1; and Fig. 3 is a cross-sectional view taken substantially along lines 3—3 of Fig. 1; and Fig. 4 is a top plan view of the leaf spring tip spacer or liner incorporated in the assembly of Figs. 1 through 3; and Fig. 5 is a side plan view of Fig. 4.

The presently devised leaf spring spacer is believed to be a marked improvement over previously devised and used spacers in that through the combined utilization of suitable material and simple construction a spacer of economical production and effective in use as compared to other spacers is provided. By selecting a material having a low coefficient of friction and good abrasive or wear resisting properties that can be molded, pressed, stamped or the like of plastic or similar material a simple spacer of general flat rectangular shape can be produced having a rib formed on one face extending longitudinally of the spacer near one end thereof and a hole through the spacer nearer its other end along the longitudinal axis of the rib. The rib is normally pressed from the flat stock of which the spacer is made, thus providing a recess in the opposite face of the spacer.

In the assembly of the spacers between the adjacent tips of spring leaves forming a nestled spring assembly wherein the leaves are of the type made from grooved section stock the rib is received in close fitting conformity in accordance with predetermined size requirements with the spacer extending longitudinally with the spring leaves and with the spacer fixedly secured to the next adjacent spring leaf from that in which the rib is received by a suitable fastener received in the hole in the spacer and a mating hole formed in the spring leaf, the head of the fastener fitting into the groove of the spring in which the rib rests. It is to be noted in view of the structural arrangement of the spacer on and between the spring leaves that relative longitudinal movement can occur between the spring leaves as they are flexed by a load applied thereto without frictional contact therebetween with the spacers restrained from either sideways or longitudinal movement out of their established position at the completion of any flexing motion.

Because of the predetermined provision for making the spacers of a material having a low coefficient of friction and good abrasive and wear-resisting properties the spring leaves can move relatively longitudinally to one another with a minimum of squeaking and uniform friction therebetween under all conditions of weather. Through the maintenance of uniform friction by the interposition of the spacers between adjacent spring leaves, spring covers normally used to prevent the dirt or other foreign matter from entering the spring assembly can be dispensed with.

Referring to the drawings for more specific details of the structure 10 represents generally a leaf spring assembly comprising a plurality of adjacently arranged or superimposed spring leaves 12 of the semi-elliptical type, each adjacent leaf being of progressively smaller size than the next leaf such that the tips or ends of the adjacent longer leaf extend longitudinally beyond the next smaller leaf with tip spacers or liners 14 arranged between adjacent leaves near the tip end of one leaf.

The spring assembly as shown is held together by a clamp assembly 16 embracing the adjacently arranged leaves and spacers.

The spring leaves 12 as viewed cross-sectionally reference being had to Fig. 3 are provided with grooves 18 running longitudinally the full length of the separate leaves and the leaves are so adjacently arranged with the grooves disposed from one another.

The tip spacers or linears 14 are each made of such a length as to extend from a point at or beyond a tip of one leaf longitudinally inwardly of the adjacent leaf a sufficient distance so as to afford ample bearing surface in the normal operational flexing action between the respective adjacent leaves and provide a rib 20 of predetermined width approximately the width of groove 18 adapted to be received therein and a hole 22 longitudinally disposed from the rib in line therewith for receipt of a fastener 24 of any suitable make so as to secure the spacer to the leaf near whose tip it is located. The fastener 24 is adapted to be fitted in a hole 26, formed in each spring leaf mating with hole 22 in the spacer, with one end portion thereof protruding into the groove 18 of the next adjacent leaf, thereby being out of interference with the leaves in any way upon relative longitudinal movement of the spring leaves to one another. As an illustration of the adaptability of the spacers to the spring leaves it is to be noted that a fastener 24 is used combinedly to secure the clamp assembly to the spring assembly as well as secure a spacer to one of the spring leaves.

The rib 20 which in the case of being formed by pressing, stamping or like manner from flat stock material provides a recess in the other face of the spacer, said rib being generally rectangular in shape and extending its greater length longitudinally of the spacer such that upon assembly with the adjacent spring leaves it permits of longitudinal movement of the adjacent leaves while at the same time restraining either the leaves or spacer from sidewise movement by the action of the rib in the groove. The fastener 24 assures the maintenance of the spacer from longitudinal movement relative to the spring leaf to which it is mounted so as to positively provide at the point of maximum longitudinal relative movement between adjacent spring leaves a positive bearing means effective to minimize or prevent squeaks that would otherwise occur.

For the purpose of deriving maximum benefit from tip spacers of the kind here proposed so as to maintain uniform friction between the spring leaves under all conditions of weather, it has been determined that spacers made from a material of low coefficient of friction and having good abrasion or wear resisting properties afford said result for prolonged periods of time.

One such material has been found in plastics of the nylon type.

Inasmuch as the spacers 24 can be formed or made in several well known manners of a great variety of materials effective to provide the desired results the invention is believed to basically reside in the nature of the spacer as to its design, application and retention to and between the adjacent spring leaves with which it is to be associated and accordingly the invention is limited only as indicated by the scope of the appended claims.

What I claim is:

1. In a leaf spring assembly comprising superimposed spring leaves, one of the spring leaves having a longitudinal groove in its surface extending the length thereof, a spacer comprising an elongated relatively flat strip of material interposed between adjacent spring leaves having a rib formed integrally therewith of equal thickness to the other portions of the spacer extending longitudinally a portion of its length oppositely disposed to a recess in its opposite surface with one end of the rib spaced a shorter distance from one end of the spacer than the other end of the rib is spaced from the opposite end of the spacer received in fitting relation in the groove of the one spring, said spacer having an opening extending through the thickness thereof longitudinally disposed from the rib intermediate the end of the spacer from which the rib is furthest spaced and one end of the rib and fastener means extending through the opening in the spacer securing the spacer to the spring leaf adjacent the one having the groove at a point along the longitudinal axis of the rib but removed a distance therefrom, said fastener having a portion thereof overlying the surface of the spacer upon which the rib is provided protruding into the groove of the adjacent spring leaf in which the spacer rib is received.

2. A spring leaf spacer of generally rectangular shape, composed of a relatively flat strip of material having low coefficient of friction and good wearing qualities having a substantially rectangular rib formed on one surface thereof complementary to a recess formed on its opposite surface, said rib and recess lying medially of the width of the spacer and extending over less than one half of the length of the spacer and said rib having one end thereof spaced a shorter distance from one end of the spacer than the other end of the rib is spaced from the opposite end of the spacer, said spacer being of single piece construction and substantially uniform thickness and having an opening therein longitudinally spaced from the rib and recess and lying in a line therewith medially of the width of the spacer.

EDWARD H. LINDEMAN.

References Cited in the file of this patent

UNITED STATES PATENTS

| Number | Name | Date |
|---|---|---|
| 2,161,838 | Thompson | June 13, 1939 |
| 2,355,801 | Hildenbrand | Aug. 15, 1944 |

FOREIGN PATENTS

| Number | Country | Date |
|---|---|---|
| 602,420 | Great Britain | May 26, 1948 |